Dec. 25, 1934.   H. C. HAYES   1,985,251
METHOD AND MEANS FOR DETERMINING THE VELOCITY OF A MOVING BODY
Filed Nov. 21, 1928   3 Sheets-Sheet 1

INVENTOR.
Harvey C. Hayes,
BY Harold Dodd
ATTORNEYS.

Dec. 25, 1934.  H. C. HAYES  1,985,251
METHOD AND MEANS FOR DETERMINING THE VELOCITY OF A MOVING BODY
Filed Nov. 21, 1928  3 Sheets-Sheet 3

Inventor
Harvey C. Hayes
By Harold Dodd
Attorney

Patented Dec. 25, 1934

1,985,251

UNITED STATES PATENT OFFICE 1,985,251

METHOD AND MEANS FOR DETERMINING THE VELOCITY OF A MOVING BODY

Harvey C. Hayes, Washington, D. C.

Application November 21, 1928, Serial No. 321,013

14 Claims. (Cl. 177—386)

(Granted under the act of March 3, 1883, as amended April 30, 1928; 370 O. G. 757)

My invention relates broadly to the production of a device in which the Doppler principle may be utilized in the determination of the velocity of travel of a body over a stationary object.

The invention consists substantially in the construction, combination and arrangement of parts associated therewith or as will be more fully hereinafter set forth as shown by the accompanying drawings and finally pointed out in the appended claims.

Reference is to be had to the accompanying drawings forming part of this specification in which like reference characters indicate corresponding parts throughout the several views, and in which.

Figure 1:
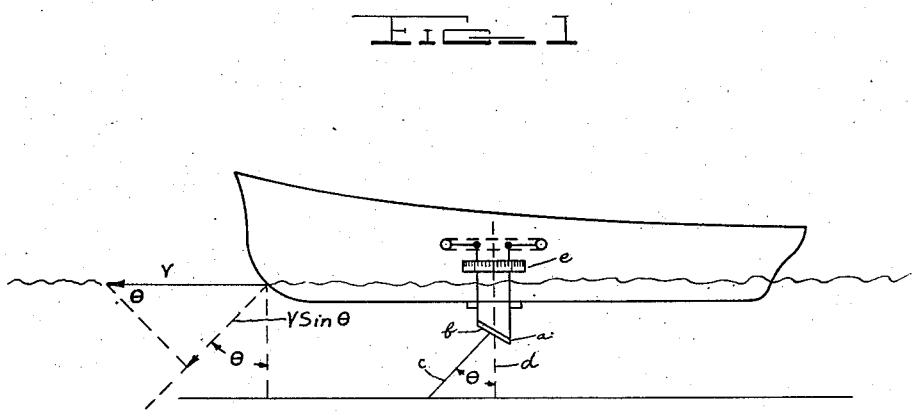
Fig. 1 is a view of my apparatus as installed upon a ship.

The following discussion of the theory upon which my device is to operate will serve an important element in the clear understanding of my invention.

If two bodies are placed in a medium capable of transferring sound energy and one body carries an acoustical transmitter and the other one an acoustical receiver, then if body one transmits sound signals of pitch ($N_1$) to body two, the pitch ($N_2$) of the received signals will be higher or lower than or equal to ($N_1$) depending respectively on whether the two bodies are approaching or receding or remain at a fixed distance apart.

If the rate at which the distance between the two bodies varies is called their relative velocity and is designated as (V), then in accordance with Doppler's principle we have the relation:—

(1) $N_2 - N_1 = KV$ where (K) is a constant of proportionality that can be readily shown to be equal to the reciprocal of the wave-length of the transmitted signal. Calling this wave length ($L_1$) we have the complete relation:—

(2) $N_2 - N_1 = V/L_1$, or,—

(3) $V = L_1(N_2 - N_1)$.

In words this equation states that the relative velocity of the two bodies is numerically equal to the wave-length of the transmitted sound multiplied by the pitch difference between the received and transmitted signals; and we have so chosen our signs that positive values of (V) means that the bodies are approaching while negative values means that they are separating.

In equation (3) the factor ($L_1$) is equal to the velocity of sound in sea water divided by the frequency ($N_1$) of the transmitted signal. Its value is, therefore, fixed and can be theoretically determined. The factor ($N_2 - N_1$) is to be determined and the accuracy with which (V) can be determined depends upon the accuracy with which this factor can be determined. It, therefore, becomes obvious that more accurate results will be obtained in the determination of (V) if the factor ($L_1$) is deliberately made small for thus the factor ($N_2 - N_1$), which is the one measured, will be proportionally larger. But since decreasing ($L_1$) means increasing the frequency of the transmitted signal it follows that the pitch of the signals will pass above and beyond the range of audibility if this procedure is carried too far.

This difficulty can be avoided by employing the heterodyne principle and the pitch of the transmitted signals made as high as we wish, for suppose both ($N_1$) and ($N_2$) are heterodyned with the same pitch ($N_0$) and the resulting audible notes be called respectively ($n_1$) and ($n_2$), then:—

(4) $N_2 - N_0 = n_2$, and (5) $N_1 - N_0 = n_1$.

Subtracting the two equations gives,—

$N_2 - N_1 = n_2 - n_1$.

So we find the actual pitch difference is equal to the heterodyned pitch difference and we can write for equation three:

(6) $V = L_1(n_2 - n_1)$, where the last factor is the difference between the heterodyned frequencies. In this way we can diminish the factor ($L_1$) to the point where the equation becomes very sensitive for determining the relative velocity (V).

The next step in the development consists in locating both transmitter and receiver on the same body and directing the signals to the other body so that their echo will come back to the receiver. This method has three advantages, first, the relative velocity is apparently doubled. This can be understood if we consider the receiver as placed at its image with respect to the sound reflecting surface. Then the variation between the object and image distance as the distance between bodies one and two changes will be doubled the actual change of distance between the two bodies. Equation (6) therefore becomes,—

(7)  $2V = L_1(n_2 - n_1)$ and it follows that the change of pitch $(n_2 - n_1)$ that is measured is made twice as great when the receiver responds to the echo instead of to the direct signals and thus the factor (V) is determined with the corresponding increase in accuracy. Secondly, the error involved in determining (V) is greatly reduced by mounting both transmitter and receiver together and utilizing the signal echoes because then both the transmitted signal and the received echo can be both heterodyned with the same note. Thus the factor $(n_2 - n_1)$ is freed from errors arising from change of pitch of the transmitter due to temperature changes or other causes. Such changes are small in terms of per cent and therefore do not appreciably affect the factor $(L_1)$, but it is obvious that they will affect the factor $(n_2 - n_1)$ greatly because both $(n_2)$ and $(n_1)$ represent in each case the difference between two comparatively large values. The third advantage is that the second body can be any body that will reflect the sound signals from the first body back again to the receiver mounted thereon. By utilizing the Doppler effect as exhibited between a transmitted signal and its echo reflected back again, the body carrying the sound installation can operate its apparatus to determine its velocity relative to anything that will reflect an echo back and in particular with respect to the sea-bottom if the body carrying the sound installation is a ship.

The nature of such an installation can be understood in connection with Fig. 1, wherein letter (a) represents the sound transmitter protruding from the bottom of a ship, the radiating face of which is indicated by letter (b), and the perpendicular to which, represented by letter (c) makes an angle $\theta$ with the perpendicular stem (d) which can be rotated about the azimuth and which carries a pointer and scale (e) which cooperate to give the azimuth angle that line (c) makes with the ship's keel in a forward direction. Sound transmitter (a) is designed (preferably) to give a directive sound beam perpendicular to face (b) and still further of a type to serve as a receiver for the signal echoes which may come back along the direction perpendicular to the transmitter face. And some portion of the sound signals do come back in this direction because the sound waves are so short that they are broken up and scattered by the irregularities of the sea-bottom much as is a beam of light upon striking a piece of frosted glass. Thus equation (7) applies to give the speed of the ship relative to the sea-bottom along the direction (c). And since its speed in this direction is equal to that over the surface along the line made on the surface by the intercept of a perpendicular plane containing line (c) multiplied by the sine of the angle that (c) makes with the perpendicular, we have the relation:—

(8)  $2 \cdot V \cdot \sin \theta = L_1(n_2 - n_1)$, or (9)  $V = \dfrac{L_1}{2 \sin \theta} \cdot (n_2 - n_1)$ where (V) is the ship's speed with respect to the sea-bottom.

In all wave motion through a homogeneous medium the product of pitch $(n)$ and corresponding wave-length (W) is constant and equal to the velocity $(u)$ of waves in the medium. As a result we have the relation:

(10)  $W \cdot n = u$, and therefore $n_1 = \dfrac{u}{W_1}$ $n_2 = \dfrac{u}{W_2}$ and therefore Equation (9) can be thrown into the form

(11)  $V = \dfrac{L_1}{2 \cdot \sin \theta} \cdot u \left( \dfrac{1}{W_2} - \dfrac{1}{W_1} \right)$, and therefore, by calibrating (13) in wave-lengths by the aid of (10) or by substituting for (10) any of the well known means for measuring wave-length directly, Formula (11) will serve to determine the value of (V), the velocity of the ship along the sea surface with respect to the sea-bottom.

The actual direction of the ship over the sea-bottom will be given by the azimuth scale when the transmitter is rotated to the position where the pitch of the echo is highest and the actual speed will be given by measuring the difference between the pitch of the echo $(n_2)$ and the pitch of the signal $(n_1)$, both $(n_2)$ and $(n_1)$ being heterodyned notes.

Figure 2:
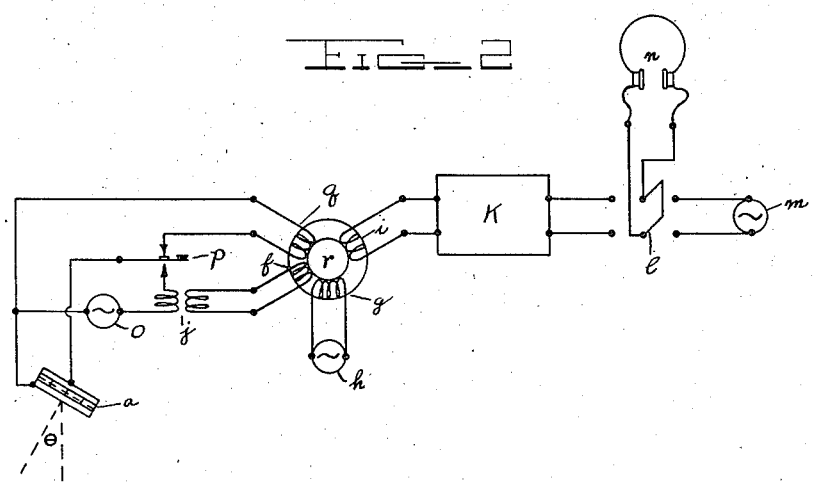
Fig. 2 is a diagrammatic illustration of my apparatus.

The method and means preferred for measuring the difference between $(n_2)$ and $(n_1)$ can be understood in connection with Fig. 2, wherein (a) represents the transmitter (preferably the type shown in Figures 3 to 7), (o) indicates the generator of high frequency alternating E. M. F. (preferably of a type employing triode power tubes such as are used in modern radio transmitters), (p) represents a transmitting key, which, when depressed, closes the transmitting circuit containing (a) and (o) and which, when free closes the transmitter in a circuit containing coil (q) of the transformer (r). This transformer carries coil (j) which is inductively coupled with the transmitter circuit at (j) and coil (g) which is energized by the heterodyne oscillator (h) and also coil (i) which forms the input to amplifier (k) the output of which connects with one pair of terminals of the double pole double switch (l). The other pair of terminals of switch (l) connect with an audio frequency oscillator (m) so designed that its pitch can be varied and calibrated to give the value of the pitch. The head phones, or loud speaker, (n) can be connected in series with the amplifier (k) or with the oscillator (m). When connected with (k) the phones respond to the heterodyned transmitter signal $(n_1)$ when key (p) is depressed and immediately when the key is released it responds to the heterodyned echo $(n_2)$. Oscillator (m) serves to determine the value of $(n_1)$ and $(n_2)$ and hence the factor $(n_1 - n_2)$. In practice key (p) is closed and switch (l) thrown alternately to right and left while the pitch of (m) is adjusted to equality with the heterodyned transmitter signal $(n_2)$. It is then thrown to the left and the pitch of the echo noted and then to the right where the pitch of (m) is adjusted to this same value which is $(n_2)$. The velocity of the ship (V) relative to the sea-bottom is then calculated by the formula:

$V = \dfrac{L_1}{2 \cdot \sin \theta} \cdot (n_2 - n_1)$ all the other factors on the right hand side of the equation having been previously determined.

In order to produce the above results it has been necessary to develop a novel sonic transmitter which I have shown in Figures 3-7.

In order to fully understand the difficulties which must be overcome the following resume of the theory and mechanics of sound production are essential.

Sound energy is ordinarily generated by causing a diaphragm to vibrate through the interaction of electromagnetic forces. Such sound generators have a natural or resonant frequency depending upon their effective mass and the restoring forces brought into play as the sound generating surface is deflected out or in from the position of equilibrium, and their efficiency is a maximum when the electric or electromagnetic driving force has the same frequency as the natural frequency of the diaphragm. This natural period decreases as the effective mass of the diaphragm increases. And, since a portion of the sound transmitting medium is carried with the diaphragm, this adds to the effective mass and tends to lower the natural frequency. This is particularly true in the case of submarine sound generators where the density of the medium is comparatively great. As a result the restoring forces must be made great if a submarine sound transmitter is to efficiently generate high pitched sound.

This can be accomplished by making the diameter of the diaphragm small or by making the plate thick. Neither procedure is satisfactory. The small diaphragm does not offer sufficient radiating area and the large thick diaphragm is too costly and bulky. Moreover, the large diaphragm tends to concentrate the sound energy into a cone-like beam having its axis perpendicular to the center of the diaphragm so that the sound transmitter cannot be used for broadcasting signals.

My improvement in sound generating apparatus provides a means whereby sound of high pitch can be generated efficiently and projected with equal intensity in all directions about the azimuth and this is accomplished by the use of light diaphragms of large sound generating area. Moreover, these diaphragms serve to concentrate the sound energy in a horizontal direction where it is to be received, or more specifically in a plane perpendicular to the axis of the diaphragm. Concentration of the sound energy toward a horizontal plane is of particular advantage in case of submarine signaling since it prevents disturbing echoes from the sea bottom which ofttimes make it impossible to read code messages because for each dot and dash transmitted several may be received as echoes. Finally such a concentration of sound energy in the horizontal plane where it is to be received increases the effective range of reception.

I accomplish these results by employing a cylindrical diaphragm with core arrangement whereby the cylinder is acted upon by radially directed forces, electrostatic or electromagnetic, the variation of which causes it to expand and contract while maintaining a circular cross-section. Under such conditions the outer surface of the cylinder becomes the sound generating surface. The restoring forces brought into play in a cylinder so vibrating are great because they act wholly in a tangential direction. They result in stretching or compressing the material of the cylinder and not in bending it. Since these stresses produce extensional and not flexural strains the natural period of vibration of the cylinder is but very slightly dependent upon the thickness of its wall. Thus the mass of the diaphragm can be made comparatively small even though the radiating area is large. The radiating area can be given any desired value without affecting the natural frequency by varying the length of the cylinder. The natural frequency of such a diaphragm is independent of its length and is the same as would be required of a sound transmitted in a medium made of the material of the cylinder and having a wave-length equal to the circumference of the cylinder. Expressed mathematically this statement becomes:—

$$n = \frac{1}{2\pi R}\sqrt{\frac{E}{D}}$$

where $(n)$ is the natural or resonant frequency of the cylinder (vibrations per second), $(R)$ is the mean radius, $(E)$ and $(D)$ are the elasticity and density respectively of the material of the cylinder.

Figure 3:
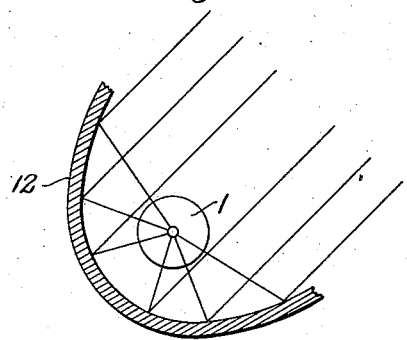
Fig. 3 is a view of one type of transmitter and reflector therefor for the production of a beam of sound.

Referring to Figures 3-7, numeral (1) indicates the cylindrical diaphragm. This seats against rubber gaskets (2) at either end to insure water tightness, and is separated from the laminated core (3) by a narrow air gap (4). The laminations of the core are pressed on the solid portion of the core (5) and pressed tightly together thereon by means of washer (6) and nut (7). The electrical leads (8) are brought out through tube 9 which threads to the top cap (10) of the transmitter. The design of the top and bottom caps is such as to hold the core rigidly concentric with the cylinder. The laminated core carries numerous narrow slots (11) directed parallel with the axis and equally spaced about its circumference. The sense of the winding of the electrical leads, as shown in Figure 3, is such as to make the core areas between slots alternate as to magnetic polarity. If, therefore, the cylinder is made of ferro-magnetic material the flux linkage between core and cylinder will be directed in accordance with that shown in Figure 2. The linkage of the magnetic flux between the core and cylinder pulls the latter inward radially. Variation of the flux linkage caused by varying the current through the windings will vary this pull. For most efficient operation the frequency of the current must be made equal to the resonant frequency of the cylinder. It is preferred that a D. C. current be made to traverse the A. C. coils or a separate winding, to prevent reversal of polarity of the core faces. If this is not done it should be recognized that the frequency of the cylinder will be twice that of the alternating current.

It must also be recognized that greatest efficiency is given if the A. C. circuit is tuned and of resonant frequency equal to that of the cylinder.

The ferro-magnetic metals and their alloys as they become magnetized change their relative dimensions somewhat in proportion to the strength of the magnetic flux induced in the material. This effect, known as magneto-striction, has opposite sign in iron and nickel. In case of iron the material lengthens in the direction of the flux lines until a certain flux density is reached and beyond this point tends to contract in the direction of the flux. Nickel contracts in the direction of the flux lines for all values of the flux density. If, therefore, an arrangement can be had whereby the cylinder can be magnetized so that the flux lines thread its material circumferentially, the change in the circumference produced by magnetostrictive forces, as the magnetizing current is varied, will cause it to contract and expand radially and therefore vibrate at its resonant frequency as a sound transmitter if the energizing current is given the proper frequency. This result will be given similarly for both an iron and a nickel cylinder but this difference, in case of the iron the cross-section of the cylinder expands with increase of flux density whereas in case of the nickel it contracts with increase of flux density. In the case of alloys of nickel and iron the opposing tendencies of the two balance and give zero magnetostriction for a composition 81% nickel and 19% iron. For greater percentages of nickel the magnetostrictive forces cause the material to contract and for less than 18% the iron predominates and causes expansion.

Figure 7:
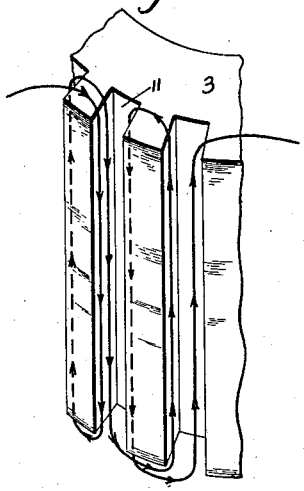
Fig. 7 is a diagrammatic view of the armature and the manner in which the coils are wound thereon.
Figure 6:
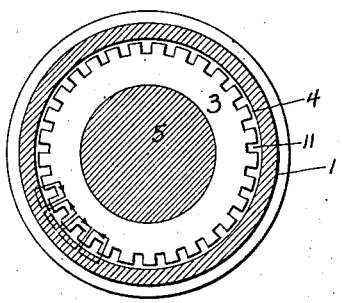
Fig. 6 is a horizontal section on line 6—6 of Fig. 5.

An examination of Figure 7 will show that my preferred method and means for driving the cylindrical diaphragm causes the magnetic flux that traverses the cylinder to be directed, for the most part, around the circumference and not parallel with an element of the cylinder. If, therefore, the cylinder is iron, or indeed an iron nickel alloy having more than 19% of iron, then the magnetostriction effects tend to make the cylinder expand when the current change is such as to increase the flux linkage between cylinder and core while at the same time this increase of flux linkage tends to pull the cylinder wall toward the core and thus contract the cross-section. Thus the magnetic and magnetostriction forces oppose one another as regards changing the cross-section of the cylinder and the efficiency of the device as a sound transmitter is decreased thereby. If, however, the cylinder is made of nickel, or indeed of an alloy of iron and nickel carrying more than 81% of nickel, the magnetic and the magnetostriction forces aid one another as regards changing the cross-section of the cylinder and the efficiency of the device as a sound transmitter is, thereby, increased.

One device for securing directional propagation of the sound waves emitted by diaphragm 1 is shown in Fig. 3, wherein the diaphragm is mounted with its longitudinal axis coincident with the focal axis of a trough-shaped reflector 12 which is parabolic in section at right angles to the axis mentioned. It is a well known property of parabolic reflectors that all waves which originate at the focus or pass therethrough before reflection go out parallel to each other after reflection, and hence the sound waves from reflector 12 will form a definitely directed beam.

Figure 4:
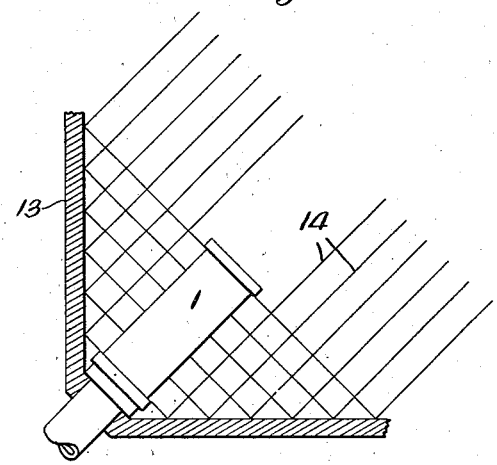
Fig. 4 is another type which may be used.
Figure 5:
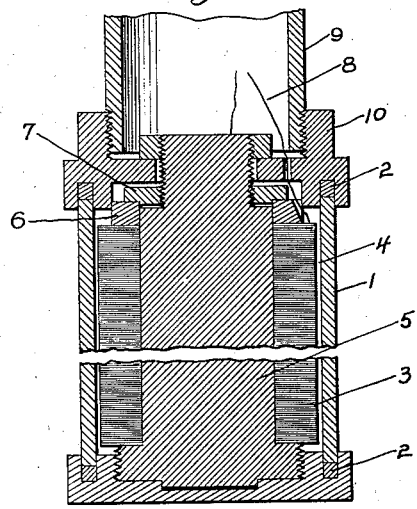
Fig. 5 is a central section through the transmitter.

In Fig. 4 the reflector 13 is frusto-conical, with an apical angle of 90°, and the cylindrical diaphragm 1 is placed with its longitudinal axis coincident with the axis of the reflector. Sound waves produced by diaphragm 1 are propagated at right angles to the axis thereof, and impinge on reflector 3 at an angle of 45° to the surface thereof. Then, since the angle of reflection equals the angle of incidence, the waves will leave the reflector surface at the same angle, all parts of the waves will move in parallel paths, and a cylindrical beam having a planar wave front will be given off in a definite direction since all parts of the wave travel through the same distance as shown by the lines 14 and since all parts of the diaphragm 1 are vibrating radially in phase.

It will be understood that the above description and accompanying drawings comprehend only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States for governmental purposes without the payment to me of any royalty thereon.

Having thus described my invention what I claim is:

1. In a sonic transmitter, a tubular diaphragm, a core concentrically mounted therein, a laminated core peripherally mounted on said first core, said second core being provided with axially extending slots, and a core winding interwoven in the slots to make the core areas between the slots alternate as to magnetic polarity.

2. In a sonic transmitter, a tubular diaphragm, a core concentrically mounted therein, a laminated annular core concentrically mounted on said first core and of substantially a length equal to said diaphragm, and provided with parallel axial grooves, a core winding interwoven in the slots substantially parallel to the axis of the core to make the core areas between the slots alternate as to magnetic polarity.

3. In a device for generating and projecting sonic signals in all directions in a plane, a cylindrical magnetic diaphragm composed of a nickel-iron alloy containing more than 81 percent of nickel, means for alternately magnetizing and demagnetizing said diaphragm so that the flux lines thread its material circumferentially whereby magneto-striction effects vibrate said diaphragm radially.

4. A generator of sonic signals comprising a cylindrical nickel-iron diaphragm, means for alternately magnetizing and demagnetizing said diaphragm so that magneto-striction effects cause said diaphragm to vibrate radially.

5. A generator of sonic signals comprising a cylindrical, nickel-iron diaphragm, means for vibrating said diaphragm radially comprising magnetic and magneto-striction actuating means.

6. A generator of sonic signals comprising a tubular diaphragm of nickel-iron alloy, means for vibrating said diaphragm radially thereof comprising magnetic and magneto-striction actuating means, the ratio of iron to nickel in said diaphragm being so proportioned that the displacement of said diaphragm due to purely magnetic effects aids the displacement of said diaphragm due to magneto-striction effects.

7. In a generator of sonic signals a tubular diaphragm of nickel-iron alloy containing more than 81% of nickel.

8. A generator of sonic signals comprising a tubular diaphragm of nickel iron alloy containing more than 81% of nickel and means for vibrating said diaphragm radially comprising magneto-striction means for shrinking said diaphragm tangentially thereof.

9. In a directional sonic transmitter the combination of a cylindrical radially vibrating diaphragm, a conical reflector disposed adjacent thereto with the axes of said diaphragm and said reflector coincident.

10. In a directional sonic transmitter the combination of a cylindrical radially vibrating diaphragm, a conical reflector comprising a right cone disposed adjacent thereto with the axes of said diaphragm and said reflector coincident.

11. In combination, a cylindrical radially vibrating diaphragm and means for reflecting the sound waves generated by said diaphragm to form a unidirectional beam having a planar wave front perpendicular to the axis of the cylindrical diaphragm.

12. A generator of compressional waves comprising a cylindrical body of paramagnetic material constituting a magneto-striction member and means associated therewith for varying the magnetic flux circumferentially thereof at a frequency corresponding to the frequency of the compressional waves to be produced.

13. In combination, a cylindrical diaphragm, means for causing said diaphragm to vibrate radially, and a hollow conical reflector comprising a right cone disposed coaxially with said diaphragm so as to encompass all but one end of said diaphragm.

14. In a unidirectional sonic transceiver, in combination, a cylindrical radially vibrating diaphragm and a right cone reflector coaxially mounted with respect thereto, with the surface of the cone reflector opposed to the surface of said diaphragm in such a manner that all lines normal to the elements of the surface of said diaphragm intersect said cone reflector and form an angle equal to one-half of a right angle with the elements of the cone with which they intersect.

HARVEY C. HAYES.